US012145175B2

(12) United States Patent
Eichhorn et al.

(10) Patent No.: US 12,145,175 B2
(45) Date of Patent: Nov. 19, 2024

(54) METHOD AND DEVICE FOR DETERMINING A QUALITY OF EMPTIES

(71) Applicant: KRONES AG, Neutraubling (DE)

(72) Inventors: Juergen Eichhorn, Lappersdorf (DE); Alexander Kaiser, Aholfing (DE); Stefan Laumer, Barbing (DE); Raphael Weiss, Mitterfels (DE); Christian Schebesta, Deggendorf (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/318,318

(22) Filed: May 16, 2023

(65) Prior Publication Data

US 2023/0390807 A1 Dec. 7, 2023

(30) Foreign Application Priority Data

Jun. 2, 2022 (DE) ......................... 102022113948.4

(51) Int. Cl.

| | |
|---|---|
| ***B07C 5/34*** | (2006.01) |
| ***B07C 3/18*** | (2006.01) |
| ***B07C 5/12*** | (2006.01) |
| ***B07C 5/36*** | (2006.01) |

(52) U.S. Cl.

CPC .............. *B07C 5/3404* (2013.01); *B07C 3/18* (2013.01); *B07C 5/12* (2013.01); *B07C 5/361* (2013.01)

(58) Field of Classification Search

CPC ........... B07C 5/3404; B07C 3/18; B07C 5/36; B07C 5/361; B07C 5/12

See application file for complete search history.

(56) References Cited

U.S. PATENT DOCUMENTS

2023/0234790 A1* 7/2023 Hume ..................... B65B 55/24
198/448

FOREIGN PATENT DOCUMENTS

| | | | |
|---|---|---|---|
| DE | 3510755 | A1 | 9/1986 |
| DE | 4136253 | A1 | 5/1993 |
| DE | 4213301 | A1 | 10/1993 |

(Continued)

OTHER PUBLICATIONS

Machine translation of DE 4136253 (Year: 1993).*
European Patent Office, Extended European Search Report 2316711.3, Oct. 11, 2023, Germany, 12 pages.

*Primary Examiner* — Michael McCullough
*Assistant Examiner* — Jessica L Burkman
(74) *Attorney, Agent, or Firm* — McCoy Russell LLP

(57) ABSTRACT

The invention relates to a method for determining a quality of empties comprising pallets, boxes and bottles which are fed to an equipment for sorting the empties according to the quality and for controlling the equipment. The method comprises: Receiving a pallet that is palletized with boxes that can comprise bottles, assigning information about an origin of the pallet; feeding the pallet to a depalletizer, determining whether the pallet is depalletizable, and assigning information to depalletizability to the pallet, and if the pallet is depalletizable, depalletizing the pallet; assigning information about the origin to each of the depalletized pallets; feeding the boxes to an empties inspection system, determining whether the boxes are unloadable, and assigning information about unloadability to each of the boxes; if the boxes are unloadable, checking the fullness with bottles and assigning information about the fullness to each of the boxes.

14 Claims, 3 Drawing Sheets

(56) References Cited

FOREIGN PATENT DOCUMENTS

| | | | |
|---|---|---|---|
| DE | 4332434 | C1 | 3/1995 |
| DE | 19645553 | A1 | 5/1998 |
| DE | 10021802 | A1 | 2/2002 |
| DE | 102009039612 | A1 | 3/2011 |
| DE | 102010028771 | A1 | 11/2011 |
| DE | 102015211380 | A1 | 12/2016 |
| DE | 102016211910 | A1 | 1/2018 |
| EP | 3025988 | A1 | 6/2016 |

* cited by examiner

METHOD AND DEVICE FOR DETERMINING A QUALITY OF EMPTIES

CROSS REFERENCE TO RELATED APPLICATION

The present application claims priority to German Patent Application No. 10 2022 113 948.4 filed on Jun. 2, 2022. The entire contents of the above-listed application are hereby incorporated by reference for all purposes.

TECHNICAL FIELD

The invention relates to a method for determining a quality of empties according to claim 1 and to a device for determining a quality of empties according to claim 12.

PRIOR ART

Current reuse system in the beverage industry can only process empties (pallets, boxes, bottles) that meet the quality requirements of the equipment operator. Therefore, pallets, boxes and/or bottles which are no longer suitable for sale due to their damage cannot be processed. Also, only empties that correspond to the beverage item to be produced can be processed. Therefore, it is necessary for the bottles to have, for example, the corresponding design, the corresponding volume and the corresponding color, and for the boxes to have, for example, the corresponding color and the corresponding print.

In addition, the empties delivered to a reuse system must also be processable, i.e., a pallet must be depalletizable and a box must be unloadable.

In order for a production flow in the reuse system to only allow processable empties, a manual sorting system outside the equipment and an automatic or partially automatic sorting system inside the equipment can be provided.

DE 10 2016 211 910 A1 discloses an inspection method for inspecting containers arranged in an empties box, wherein the containers are gripped by a head and grippers arranged thereon in a plurality of gripper rows, and are removed from the empties box. These containers are inspected with an optical inspection system, wherein the gripper rows are moved relative to each other in the longitudinal direction of the rows and, as a result, visual access to the respective container rows is created for the inspection system.

OBJECT

The object of the invention is to provide a method and a device which enable improved operation of an equipment based on an ascertained quality of empties that are supplied to the equipment.

ACHIEVEMENT

This object is achieved by the method according to claim 1 and the device according to claim 12. Further features of the invention are disclosed in the dependent claims.

The method for determining a quality of empties comprising pallets, boxes and bottles which are fed to an equipment, for example a reuse system, for sorting the empties according to the quality and for controlling the equipment comprises:

- receiving a pallet that is palletized with boxes that can comprise bottles,

- assigning information about an origin to the pallet,
- feeding the pallet to a depalletizer, determining whether the pallet is depalletizable, and assigning information about the depalletizability to the pallet,
- if the pallet is depalletizable, depalletizing the pallet,
- assigning information about the origin to each of the depalletized boxes,
- feeding the boxes to an empties inspection system, determining whether the boxes are unloadable, and assigning information about the unloadability to each of the boxes,
- if the boxes are unloadable, checking the filling with bottles and assigning information about the fullness to each of the boxes,
- using the information to control the equipment.

The pallet with the boxes and bottles can be delivered to the equipment with a truck. The boxes can be regarded as being arranged in a stack, wherein the stack can have one or more layers and can have a height.

The origin can refer to the truck, the supplier, the carrier and/or a supermarket from which the pallet originates.

The depalletizer can determine whether the pallet is depalletizable.

The origin of the boxes can refer to the pallet on which they were delivered which, from the information of the pallet, can yield a relationship with the truck, the supplier, the carrier and/or a supermarket from which the pallet and therefore the box may originate.

For each box, the empties inspection system can determine whether the box can be unloaded, for example, with an unloading device, that is to say, whether the bottles can be removed from the box by means of the unloading device.

The information about unloadability can be assigned to each of the boxes. The assignment of the information about unloadability to each of the boxes can comprise arranging a mark with the information about unloadability on the box and/or sending the information about unloadability to the data processing device by means of controlling, counting and/or positioning by devices of the equipment.

The information is used for controlling the equipment. By way of example, by checking the fullness with bottles, it can be discerned whether a predetermined quantity of bottles can be provided by the boxes. If the number falls below the predetermined quantity, the equipment can be controlled in such a way that more bottles are supplied to the equipment.

In the empties inspection system, it can also be ascertained whether the boxes are correct and whether the boxes are homogenous, and information about correctness and information about homogenity can be assigned to each of the boxes. A correct box can correspond to predetermined features in terms of color, dimensions, shape and/or a logo.

To determine the uniformity of a box, a first number of correct bottles, i.e., bottles which correspond to a predetermined type (e.g., color, dimensions and/or shape, etc.), a second number of incorrect bottles, i.e., bottles that deviate from a predetermined type (e.g., color, dimensions and/or shape, etc.), and a third number of vacancies (missing bottle(s)) in the box can be determined. A box can be considered uniform when it has only a first number of bottles and/or a third number of vacancies. A uniform box can therefore in particular have no incorrect bottles.

Information about the numbers can be assigned to each of the boxes. The assignment of the information about the numbers to each of the boxes can comprise arranging a mark with the information about the numbers on the box and/or sending the information about the numbers to the data processing device by means of controlling, counting and/or positioning by devices of the equipment.

If the boxes are unloadable, correct and uniform, the boxes can be unloaded, and the boxes can be fed to a box checking system, and the bottles can be fed to a bottle checking system. Unloading the boxes means that the bottles contained therein are gripped with a suitable unloading device and removed from the respective box. The bottles can be checked for damage (for example, damage exists or no damage exists) in the bottle checking system. For example, damage in the bottom region and/or scuffing of the bottle body or the like can be detected. Information on the origin and damage can be assigned to each of the bottles. The assignment of the information about the origin and damage to each of the bottles can comprise arranging a mark with information about the origin and damage on the bottle and/or sending the information about the origin and damage to a data processing device by means of controlling, counting and/or positioning by devices of the equipment.

The assignment of the information about the origin to the pallet can comprise arranging a mark with the origin on the pallet and/or sending the information about the origin to a data processing device by means of controlling, counting and positioning by devices of the equipment.

The equipment can comprise the data processing device.

The information can be forwarded within the equipment and can be available for combination with other information that is ascertained in the equipment.

After depalletizing, the pallet can be further fed to a pallet check, the palette can be checked, and information can be assigned to the palette for checking. For example, the check can comprise at least one from the following list: the pallet meets predetermined criteria, the pallet is intact, bottom boards and/or deck boards and/or blocks of the pallet are intact, the tensile strength of the pallet meets predetermined values.

For further use, the pallet has to satisfy, for example, required safety standards (for example intact bottom boards and/or deck boards and/or blocks and/or sufficient tensile strength) so that loading with boxes (which can contain bottles) and use for transport in the loaded state is possible.

The method can also comprise determining a height of a stack of the boxes and determining a number of the boxes therefrom. The height can be ascertained without contact. Since standardized pallets with known dimensions are generally used, the existing number of boxes can be deduced from the ascertained height.

The assignment of the information about the origin to each of the boxes can comprise arranging a mark with the origin on each of the boxes and/or sending the information about the origin to a data processing device by means of controlling, counting and/or positioning by devices of the equipment.

The origin of the boxes can refer to the pallet on which they were originally delivered which, from the information of the pallet, can yield a relationship with the truck, the supplier, the carrier and/or a supermarket from which the pallet and therefore the box can come.

The check of being filled with bottles can comprise a first number of bottles which meet predetermined criteria, a second number of bottles which do not meet predetermined criteria and/or a third number of missing bottles.

In the check of being filled with bottles, the bottles can be in the box.

The criteria can include a corresponding design, volume and color; that is, for example, whether or not a bottle conforms to a predetermined type (e.g., color, dimensions, and/or shape, etc.). Bottles missing in the box can be ascertained by vacancies in the box.

Information about the numbers can be assigned to each of the boxes. The assignment of the information about the numbers to each of the boxes can comprise arranging a mark with the information about the numbers on the box and/or sending the information about the numbers to the data processing device by means of controlling, counting and/or positioning by devices of the equipment. A box can be considered uniform when it has only a first number of bottles and/or a third number of vacancies.

The method can also comprise checking each box, for example in a box checking system, and assigning information about the check to each of the boxes. For example, the check can comprise at least one from the following list: the box fulfills predetermined criteria, the box does not fulfill predetermined criteria, the box is intact.

To check the boxes, the bottles can be unloaded from the boxes beforehand.

The criteria can comprise damage to the box, for example in the region of the handles and/or compartments, such as cracks in the material and missing material.

The emptied box can be supplied for checking, for example, to a box checking system.

For example, the box can be checked for damage (for example, damage exists or no damage exists).

Information about damage can be assigned to each of the boxes. The assignment of the information about damage to each of the boxes can comprise arranging a mark with the information about damage on the box and/or sending the information about damage to the data processing device by means of controlling, counting and/or positioning by devices of the equipment.

The method can also comprise checking each bottle, for example in a bottle checking system, and assigning information about the check to each of the bottles. For example, the check can comprise at least one from the following list: the bottle meets predetermined criteria, the bottle does not meet predetermined criteria, the bottle is intact.

To check the bottles, the bottles can be unloaded from the box.

The criteria can include damage to the bottle, for example in the bottom and/or mouth area, such as cracks in the material, missing material, and/or scuffing and/or odor in the interior of the bottle (for example in the case of PET bottles). The bottles can be checked, for example with regard to damage (for example, damage or no damage), in a bottle checking system.

The assignment of the information about the check to each of the bottles can comprise arranging a mark with information about the check on the bottle and/or sending the information about the check to a data processing device by means of controlling, counting and/or positioning by devices of the equipment.

The method can also comprise creating empties quality statistics based on the existing information.

The device for determining a quality of empties comprising pallets, boxes and bottles which are fed to an equipment for sorting the empties according to the quality and for controlling the equipment, is designed to carry out the methods as described above or below, wherein the device comprises a depalletizer and an empties inspection system.

The device can also comprise a data processing device as described above or below.

The device can also comprise an unloading device for unloading the boxes, as described above or below.

The device can also comprise an unloading device, a bottle checking system and a box checking system, as described above or below.

In addition, the device can comprise required transport devices for transporting the pallet with the boxes and bottles and for transporting the boxes (with or without bottles).

BRIEF DESCRIPTION OF FIGURES

The accompanying figures are for better understanding and for illustrating aspects of the invention. In the drawings.

DETAILED DESCRIPTION OF FIGURES

Figure 1:
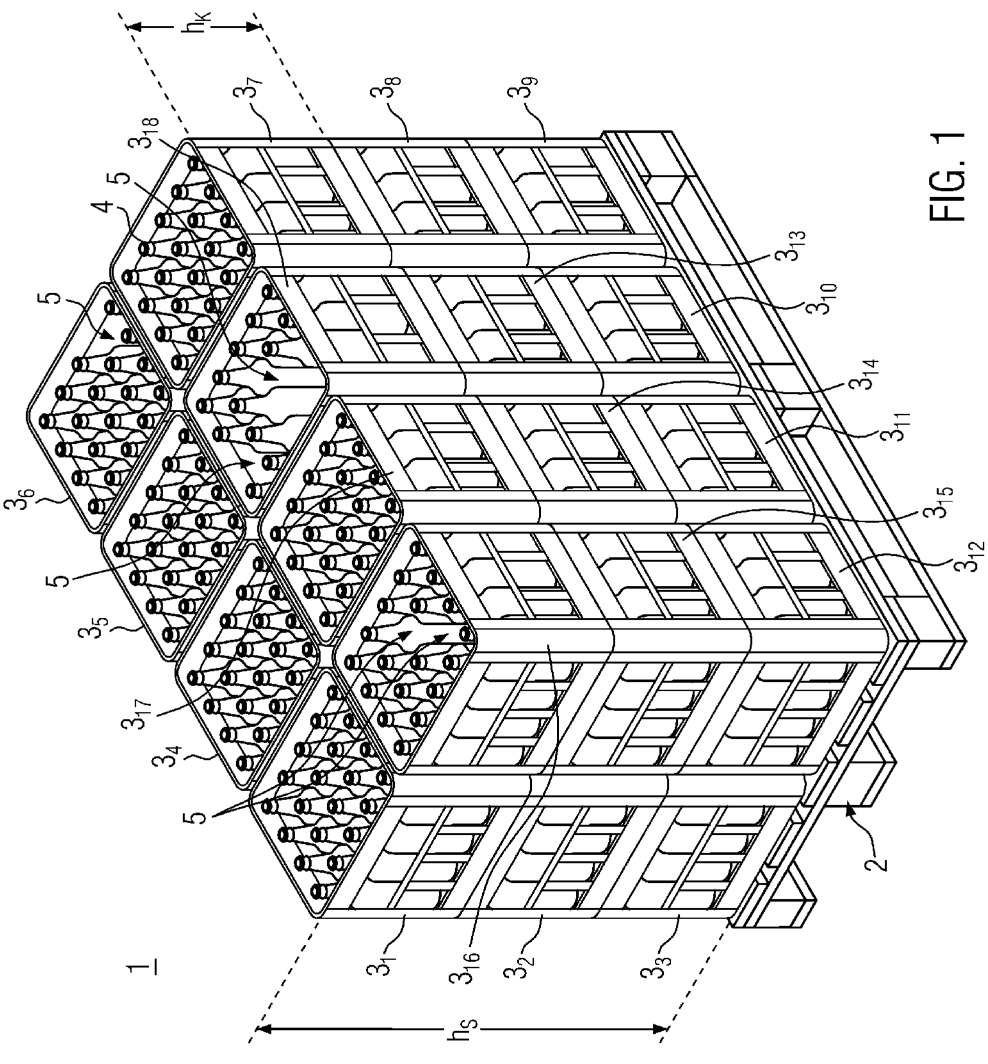
FIG. 1 shows empties comprising a pallet, boxes and bottles.

FIG. 1 shows empties 1 which, for example, can be delivered by a truck to a reuse system for beverage production. The empties 1 comprise a pallet 2, for example a Euro pallet, on which 24 boxes 3 in three layers of 2×4 boxes are arranged, in the illustration 18 boxes $\mathbf{3}_1$-$\mathbf{3}_{18}$. A box 3 has a height $h_k$, and the stack of boxes 3 on the pallet has a height $h_s$ which is $3 \cdot h_k$. It may also happen that different boxes, different dimensions, colors and/or material or the like are on a pallet 2.

Bottles 4 are arranged in the boxes 3. In this case, there can be one or more vacancies 5 at each of which a bottle is missing. This is, for example, the case with the boxes $\mathbf{3}_6$, $\mathbf{3}_{16}$ and $\mathbf{3}_{18}$. It may also happen that a box does not comprise any bottles, i.e., is empty. It may also happen that different types of bottles are in one or more of the boxes 3.

For determining a quality of the empties 2, the pallets 2, boxes 3 and bottles 4 can each be checked separately in checking devices provided for this purpose. A batch or an inspection lot which is used for determining a quality of the empties 2 can comprise one or more pallets 2, each of which is palletized with boxes 3 and bottles 4 contained therein.

Figure 2A:
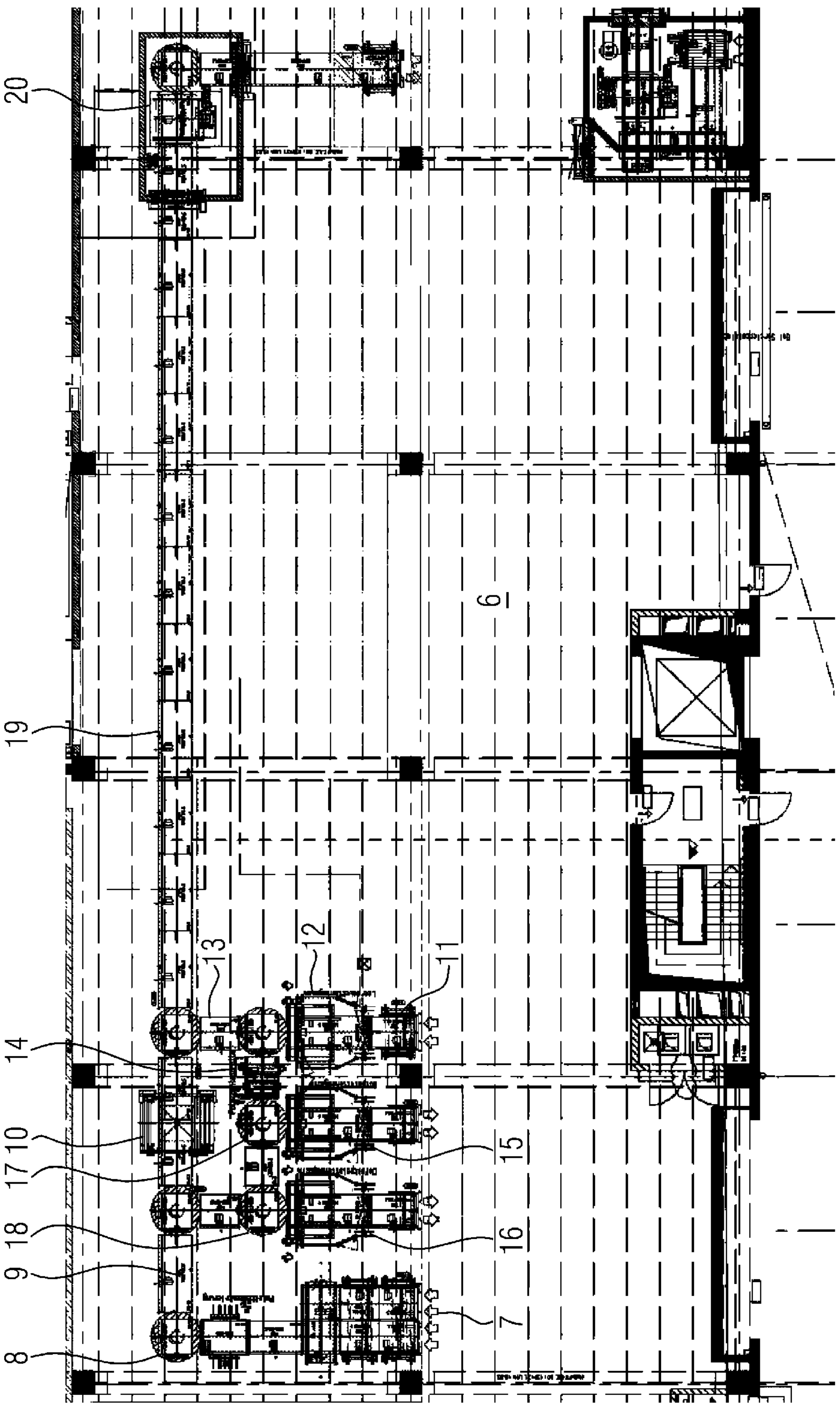
FIG. 2A shows a first level of an equipment in which a method for determining a quality of empties which is supplied to the equipment can be carried out for sorting the empties according to quality and for controlling the equipment.
Figure 2B:
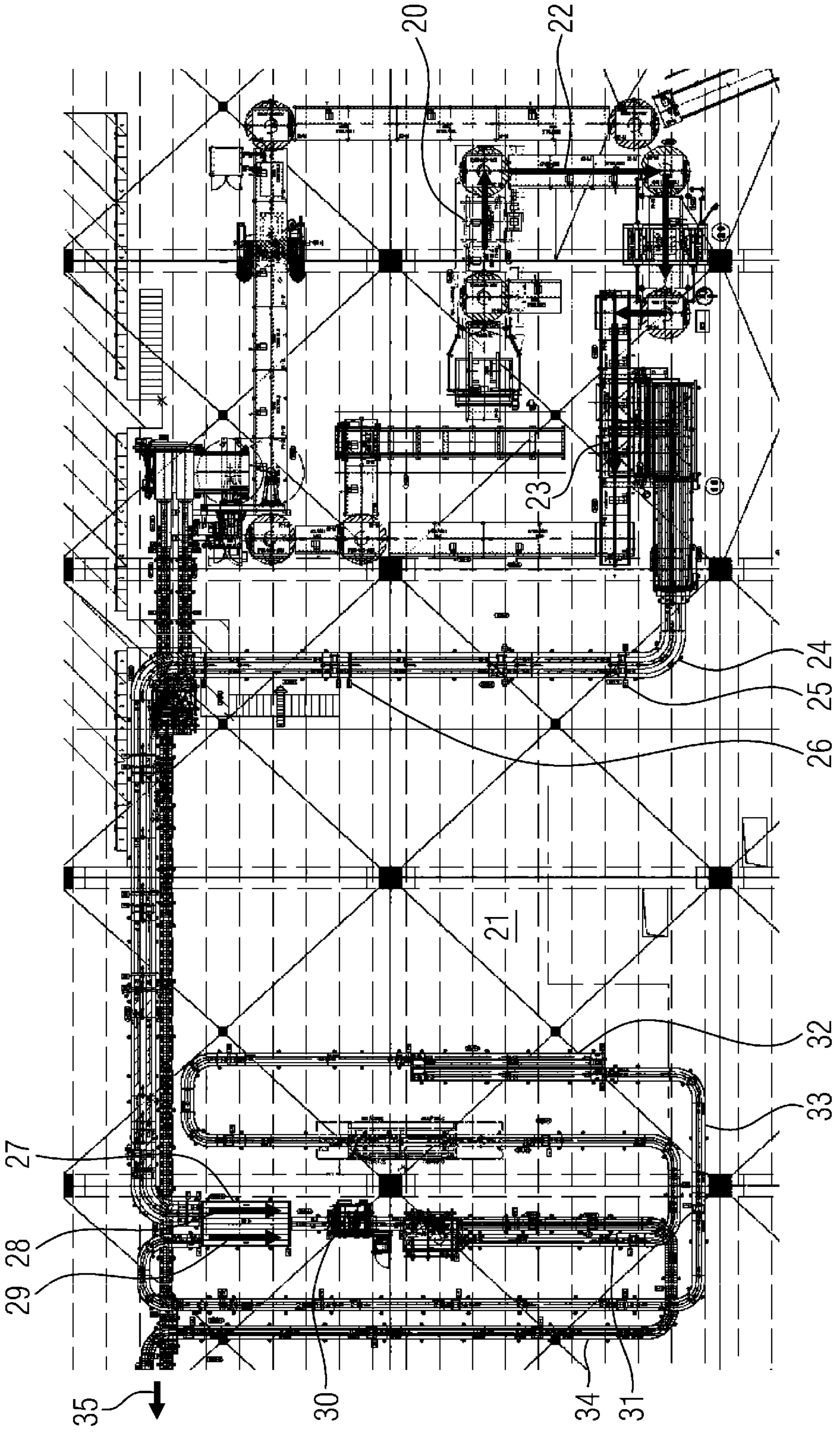
FIG. 2B shows a second level of the equipment.

FIGS. 2A and 2B show by way of example a reuse system which is arranged in two levels, wherein the two levels are connected by means of an elevator. Alternatively, a reuse system can be formed on one level.

FIG. 2A shows a first level 6, for example the ground floor, a reuse system, also referred to as an equipment for short, in which a method for determining a quality of empties 1 (as shown for example in FIG. 1) comprising pallets 2, boxes 3, bottles 4, which are supplied to the equipment, can be carried out for sorting the empties 1 according to the quality and for controlling the equipment.

The empties 1 can be delivered to the equipment by means of a truck. Each of the pallets 2, or the pallets 2 which belong to a batch or to an inspection lot, is assigned information about an origin. The assignment of the information about the origin to the pallet 2 can comprise arranging a mark with the origin on the pallet 2 and/or sending the information about the origin by means of controlling, counting and/or positioning by devices of the equipment. The origin can refer to the truck, the supplier, the carrier and/or a supermarket from which the pallet 2 originates.

The empties 1 can be fed at a feed point to the equipment 7 by a forklift directly from the truck which has delivered the empties 1. From the feed point 7, the empties 1 are fed along a first transport path 8 and a second transport path 9 by means of transport devices to a pallet extraction station 10.

In the pallet extraction station 10, the pallet 2 is replaced with an empty pallet 11. The empty pallet 11 can be a checked pallet which had a required quality in a pallet check. The empty pallet 11 can be fed to the pallet extraction station 10 from an empty pallet magazine 12.

The pallet 2 can be fed to a depalletizer, wherein it can first be ascertained whether the pallet 2 is depalletizable, that is to say whether the boxes 3 with the bottles 4 contained therein are removable from the pallet 2. If the pallet 2 can be depalletized, the pallet 2 and the boxes 3 with the bottles 4 are depalletized in the pallet extraction station 10 on an empty pallet 11. The pallet 2 is assigned information about the depalletizability to the pallet 2. The assignment of the information about the origin to the pallet 2 can comprise arranging a mark with the origin on the pallet 2 and/or sending the information about the origin to a data processing device by means of controlling, counting and/or positioning by devices of the equipment.

The empty pallet 11 with the boxes 3 and bottles 4 is transported along a third transport path 19 by means of transport devices to an elevator 20, by means of which it is transported from the first level 6 of the equipment to a second level of the equipment (see FIG. 2B).

The pallet 2 is fed via a fourth transport path 13 to a pallet check 14. In the pallet checking system 14, the pallet 2 is checked, and information about the check is assigned to the pallet 2. The check can comprise at least one from the following list: the pallet 2 meets predetermined criteria, the pallet 2 is intact, bottom boards and/or deck boards and/or blocks of the pallet 2 are intact, tensile strength of the pallet 2 meets predetermined values. The assignment of the information about the check to the pallet 2 can comprise arranging a mark with the information about the check on the pallet 2, and/or sending the information about the check to the data processing device by means of controlling, counting and/or positioning by devices of the equipment.

If the check reveals that the pallet 2 is defective, i.e., for example, does not meet the predetermined criteria, it can be fed via a fifth transport path 17 to a defective pallet magazine 15.

If the check reveals that the pallet 2 is good, i.e., for example, meets the predetermined criteria, it can be fed via a sixth transport path 18 to a good pallet magazine 16. Pallets 2 from the good pallet magazine 16 can be transferred to the empty pallet magazine 12 and then used as empty pallets 11.

FIG. 2B shows a second level 21 of the equipment in which the boxes 3 and the bottles 4 are checked. The empty pallet 11 with the boxes 3 and the bottles 4 contained therein enters the second level 21 by means of the elevator 20. Along a seventh transport path 22, the empty pallet 11 is transported with the boxes 3 and the bottles 4 to an unloading device 23 which is designed here as a duplex unloader. In the unloading device 23, it is also possible to determine a height of the stack of boxes 3 on the empty pallet 11 and therefore a number of existing boxes 3. The boxes 3 with the bottles 4 are unloaded, wherein information about the origin is assigned to each of the boxes 3 during unloading. The assignment of the information about the origin to each of the boxes 3 can comprise arranging a mark with the origin on the box 3 and/or sending the information about the origin to the data processing device by means of controlling, counting and/or positioning by devices of the equipment.

By means of a bundle transport device 24, the unloaded boxes 3 are fed past a first inspection device 25 and a second inspection device 26 via a first feed 28 to a box merging system 27 and therefore to an empties inspection system 30. The first and second inspection devices 25, 26 can each be used to check for empties-related defects that may require operator intervention.

For each box 3, the empties inspection system 30 can determine whether the box 3 can be unloaded with an unloading device 35, that is to say, whether the bottles 4 can be removed from the box 3 by means of the unloading device 35. Information about unloadability is assigned to each of the boxes. The assignment of the information about unloadability to each of the boxes 3 can comprise arranging a mark with the information about unloadability on the box 3 and/or sending the information about unloadability to the data processing device by means of controlling, counting and/or positioning by devices of the equipment. In addition, it is ascertained whether the box 3 is correct, i.e., whether it corresponds to a predetermined type (e.g., color, dimensions, shape and/or logo, etc.). Information about the correctness is assigned to each of the boxes. The assignment of the information about the correctness to each of the boxes 3 can comprise arranging a mark with the information about correctness on the box 3 and/or sending the information to the data processing device by means of controlling, counting and/or positioning by devices of the equipment.

In addition, a first number of correct bottles, i.e., bottles which correspond to a predetermined type (e.g., color, dimensions and/or shape, etc.), a second number of incorrect bottles, i.e., bottles that deviate from a predetermined type (e.g., color, dimensions and/or shape, etc.), and a third number of vacancies 5 in the box 3 can be determined. Information about the numbers is assigned to each of the boxes 3. The assignment of the information about the numbers to each of the boxes 3 can comprise arranging a mark with the information about the numbers on the box 3 and/or sending the information about the numbers to the data processing device by means of controlling, counting and/or positioning by devices of the equipment. A box 3 can be considered uniform when it has only a first number of bottles 4 and/or a third number of vacancies 5.

Boxes 3 which are unloadable and correct and have only a first number of bottles 4 and/or a third number of vacancies 5 can be fed via a tenth transport path 34 to a subsequent unloading device 35. The bottles 4 can be removed from the box 3 by means of the unloading device 35 and then fed to a bottle checking system in which, for example, damage (for example, damage exists or no damage exists) to the bottles 4 can be checked. Information about origin and damage can be assigned to each of the bottles 4. The assignment of the information about the origin and damage to each of the bottles 4 can comprise arranging a mark with information about the origin and damage on the bottle 4 and/or sending the information about the origin and damage to the data processing device by means of controlling, counting and/or positioning by devices of the equipment.

The emptied box 3 can be fed to a box checking system in which, for example, the box 3 can be checked for damage (for example, damage exists or no damage exists). Information about damage can be assigned to each of the boxes 3. The assignment of the information about damage to each of the boxes 3 can comprise arranging a mark with the information about damage on the box 3 and/or sending the information about damage to the data processing device by means of controlling, counting and/or positioning by devices of the equipment.

Boxes 3 that are not unloadable and/or not correct and/or comprise a second number of bottles can be fed via an eighth transport path 31 to a manual sorting system 32. There, non-unloadability can be rectified, for example by removing an object from the box 3 which prevents unloading, and/or an incorrect box 3 can be removed and/or the second number of bottles can be removed. Thereafter, the box 3 can be supplied with bottles 4 via a ninth transport path 33 to a second feed 29, which introduces the box 3 with the bottles 4 into the box merging system 27. In the empties inspection system 30, no new information is assigned to the boxes 3 and bottles 4 that come from the manual sorting system.

FIGS. 1-2 are drawn to scale, although other relative sizing and positioning may be used, if desired.

The invention claimed is:

1. A method for determining a quality of empties comprising pallets, boxes, and bottles, which are fed to an equipment for sorting the empties according to the quality and for controlling the equipment, wherein the method comprises:

receiving a pallet that is palletized with boxes that can comprise bottles, assigning information about an origin to the pallet, feeding the pallet to a depalletizer, determining whether the pallet is depalletizable, and assigning information about the depalletizability to the pallet, if the pallet is depalletizable, depalletizing the pallet, assigning information about the origin to each of the depalletized boxes, feeding the boxes to an empties inspection system, determining whether the boxes are unloadable, and assigning information about unloadability to each of the boxes, if the boxes are unloadable, checking the filling with bottles and assigning information about the fullness to each of the boxes, and using the information to control the equipment.

2. The method according to claim 1, wherein, in the empties inspection system, it is also ascertained whether the boxes are correct and whether the boxes are uniform, and wherein information about correctness and information about uniformity can be assigned to each of the boxes.

3. The method according to claim 2, wherein if the boxes are unloadable, correct and homogenous, the boxes are unloaded and the boxes are fed to a box checking system, and the bottles are fed to a bottle checking system.

4. The method according to claim 1, wherein the assignment of the information about the origin of the pallet comprises:

arranging a mark with the origin on the pallet and/or forwarding the information about the origin to a data processing device by means of controlling, counting and/or positioning by devices of the equipment.

5. The method according to claim 1, wherein after depalletizing the following is performed:

feeding the pallet to a pallet check, checking the pallet and assigning information about the check to the pallet, wherein, for example, the check comprises at least one from the following list:

the pallet meets predetermined criteria, the pallet is intact, bottom boards and/or deck boards and/or blocks of the pallet are intact, tensile strength of the pallet meets predetermined values.

6. The method according to claim 5, wherein the check for being filled with bottles comprises:

a first number of bottles that meet predetermined criteria, a second number of bottles that do not meet predetermined criteria, and/or a third number of missing bottles.

7. The method according to claim 5, further comprising checking each box, for example in a box checking system, and assigning information about the check to each of the boxes, wherein, for example, the check comprises at least one from the following list:

the box fulfills predetermined criteria, the box does not fulfill predetermined criteria, the box is intact.

8. The method according to claim 5, further comprising checking each bottle, for example in a bottle checking system, and assigning information about the check to each of the bottles, wherein, for example, the check comprises at least one from the following list:

the bottle fulfills predetermined criteria, the bottle does not fulfill predetermined criteria, the bottle is intact.

9. The method according to claim 1, further comprising:

determining a height of a stack of boxes and determining a number of boxes therefrom.

10. The method according to claim 1, wherein the assignment of the information about the origin to each of the boxes comprises:

arranging a label with the origin on each of the boxes and/or forwarding the information about the origin to a data processing device by means of controlling, counting and/or positioning by devices of the equipment.

11. The method of claim 1, creating an empties quality statistic based on the existing information.

12. A device for determining a quality of empties comprising pallets, boxes and bottles which are fed to an equipment for sorting the empties according to the quality and for controlling the equipment, the device comprising:

a depalletizer, an empties inspection system, an unloading device, a bottle checking system, and a box checking system.

13. The device according to claim 12, further comprising a data processing device.

14. The device according to claim 12, further comprising an unloading device for unloading the boxes.

* * * * *